United States Patent
Ye

(10) Patent No.: US 11,321,825 B2
(45) Date of Patent: May 3, 2022

(54) ALERTING METHOD AND ALERTING DEVICE FOR MONITORING COLOR SHIFT OF DISPLAY PANEL

(71) Applicant: TCL China Star Optoelectronics Technology Co., Ltd., Shenzhen (CN)

(72) Inventor: Qiaoyun Ye, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 304 days.

(21) Appl. No.: 16/617,316

(22) PCT Filed: Sep. 18, 2019

(86) PCT No.: PCT/CN2019/106311
§ 371 (c)(1),
(2) Date: Nov. 26, 2019

(87) PCT Pub. No.: WO2021/012369
PCT Pub. Date: Jan. 28, 2021

(65) Prior Publication Data
US 2021/0358098 A1    Nov. 18, 2021

(30) Foreign Application Priority Data

Jul. 24, 2019 (CN) .................. 201910670266.X

(51) Int. Cl.
*H04N 5/00* (2011.01)
*G06T 7/00* (2017.01)
(Continued)

(52) U.S. Cl.
CPC .......... *G06T 7/001* (2013.01); *G02F 1/1309* (2013.01); *G06F 3/14* (2013.01); *G06T 7/90* (2017.01);
(Continued)

(58) Field of Classification Search
CPC . G06T 2207/30121; G06T 7/001; G06T 7/90; G06T 2207/20072; G08B 21/24; H04N 5/372; G02F 1/1309; G06F 3/14
See application file for complete search history.

(56) References Cited

U.S. PATENT DOCUMENTS

2014/0185048 A1    7/2014  Lin
2018/0357944 A1*  12/2018  Tang ................ G09G 3/3208
2019/0333203 A1*  10/2019  Li .................... G02F 1/1309

FOREIGN PATENT DOCUMENTS

CN        102348127 A  *  2/2012
CN        102348127 A     2/2012
(Continued)

OTHER PUBLICATIONS

"CN102348127A Translation". (Year: 2012).*
"CN103033343A Translation". (Year: 2013).*

*Primary Examiner* — Zhihan Zhou
(74) *Attorney, Agent, or Firm* — Taft Stettinius & Hollister LLP

(57) ABSTRACT

The present invention provides an alerting method for monitoring a color shift of a display panel. The alerting method includes: generating a grayscale waveform diagram for an entire frame according to a normal pixel pattern of the display panel, the grayscale waveform diagram having waveform setting values; generating a grayscale waveform diagram for an entire frame according to a pixel pattern of a display panel to be tested, the grayscale waveform having waveform reference values; and obtaining a predetermined difference value between each of the waveform reference values and each of the waveform setting values, and sending out an alerting message when the predetermined difference value exceeds a specified value.

14 Claims, 4 Drawing Sheets

(51) Int. Cl.
*G06T 7/90* (2017.01)
*G02F 1/13* (2006.01)
*G06F 3/14* (2006.01)
*G08B 21/24* (2006.01)
*H04N 5/372* (2011.01)

(52) U.S. Cl.
CPC ............. *G08B 21/24* (2013.01); *H04N 5/372* (2013.01); *G06T 2207/20072* (2013.01); *G06T 2207/30121* (2013.01)

(56) References Cited

FOREIGN PATENT DOCUMENTS

| | | | | |
|---|---|---|---|---|
| CN | 103033343 | A | * | 4/2013 |
| CN | 103076344 | A | | 5/2013 |
| CN | 107144993 | A | | 9/2017 |
| CN | 109147712 | A | | 1/2019 |

* cited by examiner

ALERTING METHOD AND ALERTING DEVICE FOR MONITORING COLOR SHIFT OF DISPLAY PANEL

CROSS REFERENCE TO RELATED APPLICATIONS

This application claims priority to, and the benefit of, International Application No. PCT/CN2019/106311, filed on Sep. 18, 2019, which claims priority to, and the benefit of, Chinese Application No. 201910670266.X, filed on Jul. 24, 2019. The entire disclosures of each of the above applications are incorporated herein by reference.

1. FIELD OF DISCLOSURE

The present invention relates to liquid crystal displays and in particular, to an alerting method and an alerting device for monitoring a color shift of a liquid crystal display panel.

2. DESCRIPTION OF RELATED ART

A charge coupled device (CCD) is a photoelectric conversion device with advantages such as small size, high sensitivity, low noise, fast reading speed, a high dynamic range and full spectrum response. CCD has been widely used in image sensing and non-contact measurement, monitoring, and other fields. In conventional manufacturing processes of liquid crystal displays (LCDs), CCD monitoring technology is used to detect whether RGB color resists have a color shift. However, due to the fact that CCD driving methods have shortcomings, such as difficulty in adjustments and poor flexibility, it is often impossible to obtain a reminder of abnormality, so an on-site technician is unable to adjust process parameters in real time. As a result, it is hard to improve production yields for RGB color resists and display quality. Therefore, related monitoring technologies are not good.

SUMMARY

In conventional manufacturing processes of liquid crystal displays (LCDs), it is detected by CCD monitoring technology whether RGB color resists have a color shift. However, due to the fact that CCD driving methods have shortcomings, such as difficulty in adjustments and poor flexibility, it is often impossible to obtain a reminder of abnormality, so a technician is unable to adjust process parameters in real time. As a result, it is hard to improve production yields for the RGB color resists and display quality. Therefore, related monitoring technologies are not good.

It is an objective of the present invention to provides an alerting method for monitoring a color shift of a display panel, thereby improving a technique of monitoring a pixel color shift, and effectively improving quality of the display panel and production yields of RGB color resists.

Accordingly, the present invention provides an alerting method for monitoring a color shift of a display panel, comprising:

step S10: generating a grayscale waveform diagram for an entire frame according to a normal pixel pattern of the display panel, wherein the grayscale waveform diagram has a plurality of waveform setting values;

step S20: generating a grayscale waveform diagram for an entire frame according to a pixel pattern of a display panel to be tested, wherein the grayscale waveform has a plurality of waveform reference values; and step S30: obtaining a predetermined difference value between each of the waveform reference values and each of the waveform setting values, wherein an alerting message is sent out when the predetermined difference value exceeds a specified value.

According to one embodiment of the present invention, in step S30, the waveform setting values comprise a plurality of wave width setting values and a plurality of wave height setting values, the waveform reference values comprise a plurality of wave width reference values and a plurality of wave height reference values, and the alerting message is an alarm sound or a reminder displayed on a screen.

According to one embodiment of the present invention, the predetermined difference values are obtained by comparing each of the wave width setting values and each of the wave width reference values and by comparing each of the wave height setting values and each of the wave height reference values, wherein an alerting message is sent out when any of the predetermined difference values exceeds a specified value.

According to one embodiment of the present invention, the alerting method further comprises obtaining a difference value between each two adjacent wave width reference values or each two adjacent wave height reference values, wherein the alerting message is sent out when the difference value exceeds a specified value.

According to one embodiment of the present invention, in step S10 and step S20, the alerting method further comprises generating, by a monitoring member, each of the grayscale waveform diagrams; the monitoring member comprises an imaging assembly and a procedure module stored in the imaging assembly; and according to the grayscale waveform diagrams of the display panel or the display panel to be tested, the imaging assembly automatically generates the waveform setting values or the waveform reference values by a software module.

According to one embodiment of the present invention, the imaging assembly comprises a light source and a charged coupled device (CCD) connected to the light source, the CCD receives reflected light from the light source, and the software module obtains the waveform setting values or the waveform reference values according to the reflected light.

According to one embodiment of the present invention, the alerting method further comprises step S40: when the alerting message is sent out, shutting down a machine, determining a color-shift abnormal type, and adjusting a corresponding processing parameter, wherein the color-shift abnormal type includes a pixel color-loss type or a pixel color-shift type.

According to one embodiment of the present invention, a horizontal axis of the grayscale waveform diagram indicates a distance, a vertical axis of the grayscale waveform diagram indicates brightness, the grayscale waveform diagram further comprises a plurality of waveforms and a pixel pitch connected between the waveforms, each of the waveforms is a square wave, and brightness of each pixel pitch is close to zero.

Furthermore, the present invention provides an alerting device for monitoring a color shift of a display panel, comprising use of the above-mentioned alerting method for monitoring the color shift of the display panel.

According to one embodiment of the present invention, the waveform setting values comprise a plurality of wave width setting values and a plurality of wave height setting values, the waveform reference values comprise a plurality of wave width reference values and a plurality of wave height reference values, and the alerting message is an alarm sound or a reminder displayed on a screen.

According to one embodiment of the present invention, the predetermined difference values are obtained by comparing each of the wave width setting values and each of the wave width reference values and by comparing each of the wave height setting values and each of the wave height reference values, wherein an alerting message is sent out when any of the predetermined difference values exceeds a specified value.

According to one embodiment of the present invention, the alerting method further comprises obtaining a difference value between each two adjacent wave width reference values or each two adjacent wave height reference values, wherein the alerting message is sent out when the difference value exceeds a specified value.

According to one embodiment of the present invention, the alerting method further comprises generating, by a monitoring member, each of the grayscale waveform diagrams; the monitoring member comprises an imaging assembly and a procedure module stored in the imaging assembly; and according to the grayscale waveform diagrams of the display panel or the display panel to be tested, the imaging assembly automatically generates the waveform setting values or the waveform reference values by a software module.

According to one embodiment of the present invention, the imaging assembly comprises a light source and a charged coupled device (CCD) connected to the light source, the CCD receives reflected light from the light source, and the software module obtains the waveform setting values or the waveform reference values according to the reflected light.

According to one embodiment of the present invention, when the alerting message is sent out, shutting down a machine, determining a color-shift abnormal type, and adjusting a corresponding processing parameter, wherein the color-shift abnormal type includes a pixel color-loss type or a pixel color-shift type.

According to one embodiment of the present invention, a horizontal axis of the grayscale waveform diagram indicates a distance, a vertical axis of the grayscale waveform diagram indicates brightness, the grayscale waveform diagram further comprises a plurality of waveforms and a pixel pitch connected between the waveforms, each of the waveforms is a square wave, and brightness of each pixel pitch is close to zero.

Advantages of the Present Invention

The present invention also provides the following functions: users can set the wave width setting values and the wave height setting values by means of the software module of the monitoring member, thus facilitating adjustment, improving sensitivity, and effectively detecting abnormality of color resists. Therefore, the present invention can effectively provide alerting massages/reminders displayed on a screen, so that an on-site personnel can adjust process parameters in real time, and improve production yields of RGB color resists and display quality.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

References to "embodiments" in the detailed description mean that the specific features, structures or characteristics described in connection with the embodiments may be included in at least one embodiment of the invention. The same terms appearing in different places in the specification are not necessarily limited to the same embodiment, but should be understood as independent or alternative embodiments to other embodiments. In view of the technical solutions disclosed in the embodiments of the present invention, those skilled in the art should understand that the embodiments described herein may have other combinations or modifications in accordance with the embodiments of the present invention.

Figure 1:
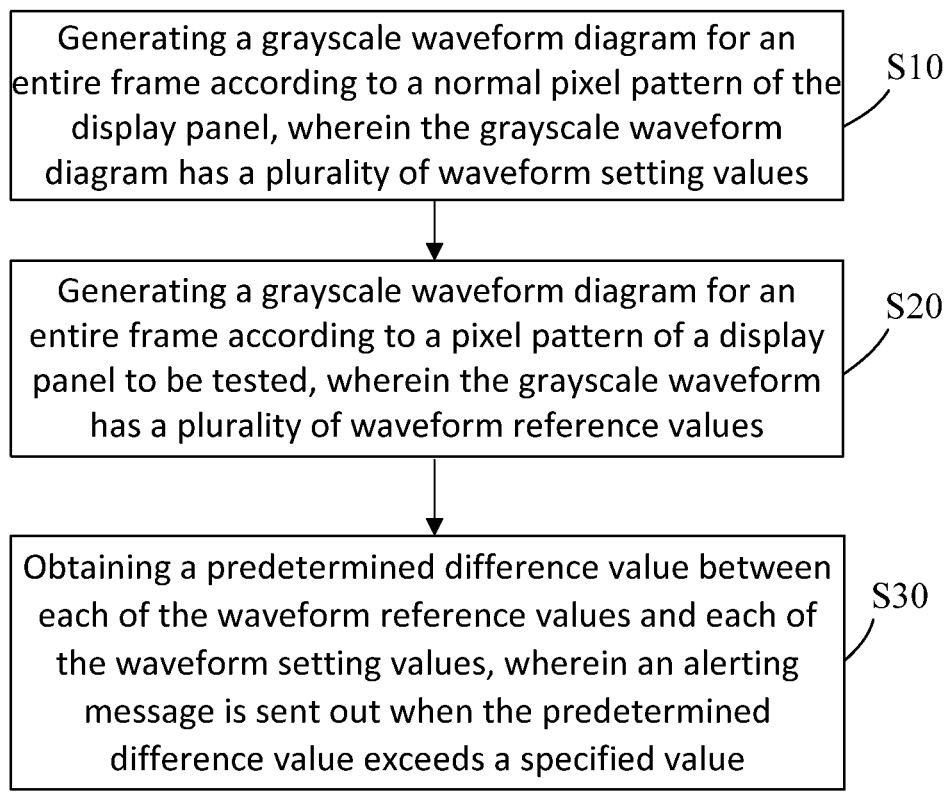
FIG. 1 is a process flow diagram illustrating an alerting method for monitoring a color shift of a display panel according to the present invention.

Please refer to FIG. 1. FIG. 1 is a process flow diagram illustrating an alerting method for monitoring a color shift of a display panel. As shown in FIG. 1, the present invention provides an alerting method for monitoring a color shift of a display panel, comprising the following steps:

step S10: generating a grayscale waveform diagram for an entire frame according to a normal pixel pattern of the display panel, wherein the grayscale waveform diagram has a plurality of waveform setting values;

step S20: generating a grayscale waveform diagram for an entire frame according to a pixel pattern of a display panel to be tested, wherein the grayscale waveform has a plurality of waveform reference values b1 to c3; and step S30: obtaining a predetermined difference value between each of the waveform reference values b1 to c3 and each of the waveform setting values B1 to C3, wherein an alerting message is sent out when the predetermined difference value exceeds a specified value. The specified value is, for example, a value larger than zero; configurations may vary as required.

Figure 2:
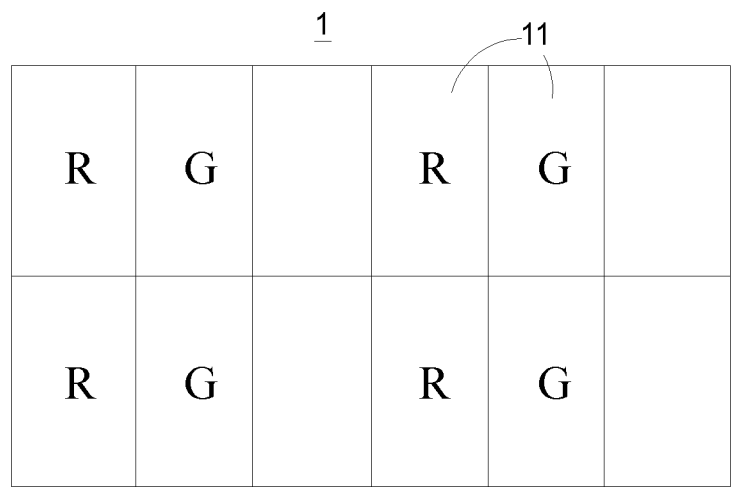
FIG. 2 is a schematic view of the present invention, illustrating a normal pixel pattern of the display panel.
Figure 3:
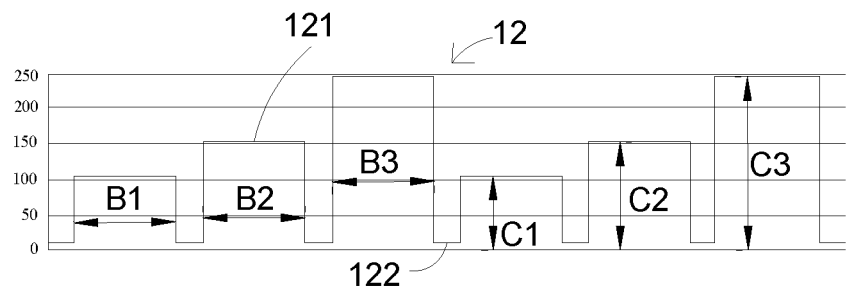
FIG. 3 is a grayscale waveform diagram for an entire frame, which is generated based on FIG. 2.

Please also refer to FIGS. 2 and 3. FIG. 2 is a schematic view illustrating a normal pixel pattern of the display panel of the present invention, and FIG. 3 is a grayscale waveform diagram for an entire frame, which is generated from the normal pixel pattern of FIG. 2. The normal pixel pattern is an organic material normally applied in a pixel defining layer (not illustrated) without leakage, excessive thinness, or other problems. As shown in FIG. 2, the normal pixel pattern 1 of the display panel is constituted by sub-pixels 11 such as red, green, and blue (RGB) sub-pixels. FIG. 2 merely shows red and green sub-pixels 11. As shown in FIG. 3, the grayscale waveform diagram 12 has a plurality of waveform setting values B1 to C3. A horizontal axis of the grayscale waveform diagram 12 indicates a distance, and a vertical axis indicates brightness. The grayscale waveform diagram 12 further comprises a plurality of waveforms 121 and a pixel pitch 122 connected between the waveforms 121, each of the waveforms 121 is preferably a square wave, and brightness of each pixel pitch 122 is close to zero.

Figure 4:
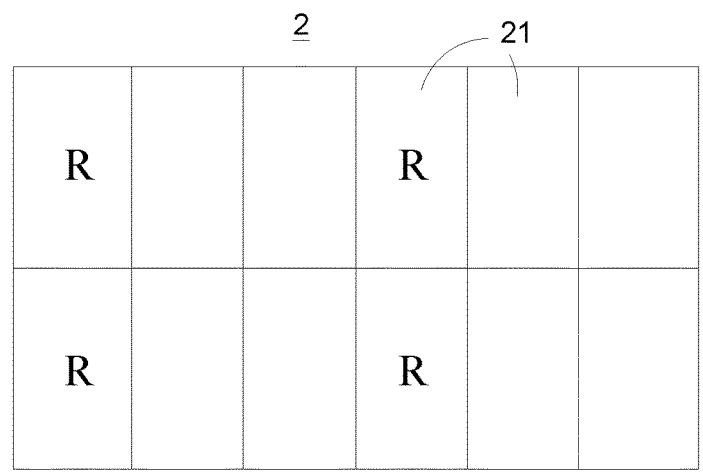
FIG. 4 is a schematic view of the present invention, illustrating an abnormal pixel pattern of a display panel to be tested.
Figure 5:
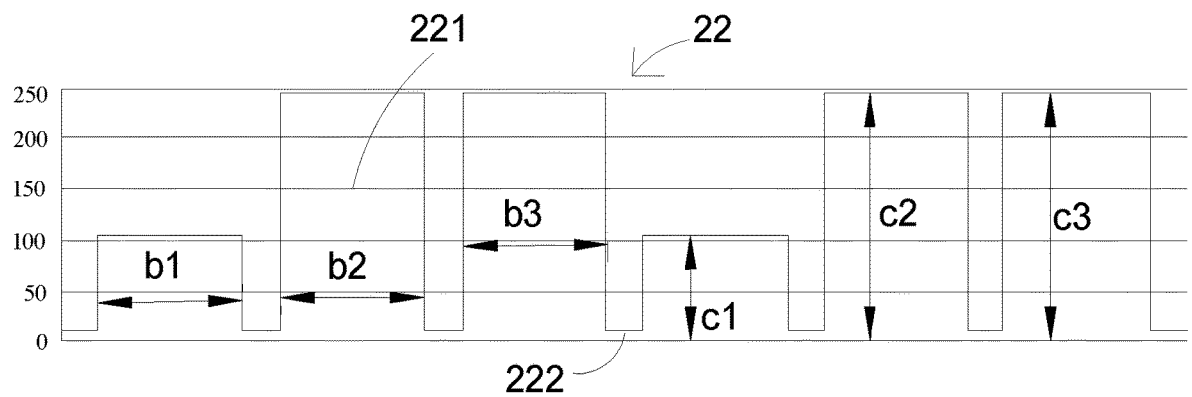
FIG. 5 is a grayscale waveform diagram for an entire frame, which is generated based on FIG. 4.

Please also refer to FIGS. 4 and 5. FIG. 4 is a schematic view of the present invention, illustrating an abnormal pixel pattern of a display panel to be tested. FIG. 5 is a grayscale waveform diagram for an entire frame according to the abnormal pixel pattern of FIG. 4. As shown in FIG. 4, similarly, the pixel pattern 2 of the display panel is constituted by sub-pixels 21 such as red, green, and blue (RGB) sub-pixels. FIG. 4 merely shows red sub-pixels 21. As shown in FIG. 5, the grayscale waveform diagram 22 has a plurality of waveform reference values b1 to c3. A horizontal axis of the grayscale waveform diagram 22 indicates a distance, and a vertical axis indicates brightness. The grayscale waveform diagram 22 further comprises a plurality of waveforms 221 and a pixel pitch 222 connected between the waveforms 221, each of the waveforms 221 is preferably a square wave, and brightness of each pixel pitch 222 is close to zero.

In step S30, as shown in FIGS. 3 and 5, the waveform setting values B1 to C3 comprise a plurality of wave width setting values B1 to B3 and a plurality of wave height setting values C1 to C3, the waveform reference values b1 to c3 comprise a plurality of wave width reference values b1 to b3 and a plurality of wave height reference values c1 to c3. The predetermined difference values are obtained by comparing each of the wave width setting values B1 to B3 and each of the wave width reference values b1 to b3 and by comparing each of the wave height setting values C1 to C3 and each of the wave height reference values c1 to c3, wherein an alerting message is sent out when any of the predetermined difference values exceeds a specified value. The alerting message is an alarm sound or a reminder displayed on a screen. Therefore, the present invention improves a technique of monitoring the pixel color shift, and effectively improves the quality of the display panel and the production yields of the RGB pixels/color resists.

It should be noted that, in steps S10 and S20, the alerting method further comprises generating, by a monitoring member (not illustrated), each of the grayscale waveform diagrams 12, 22; the monitoring member comprises an imaging assembly (not illustrated) and a procedure module (not illustrated) stored in the imaging assembly; and according to the grayscale waveform diagrams 12, 22 of the display panel or the display panel to be tested, the imaging assembly automatically generates the waveform setting values B1 to C3 or the waveform reference values b1 to c3 by a software module. In details, the imaging assembly comprises a light source and a charged coupled device (CCD) connected to the light source, the CCD receives reflected light from the light source, and the software module obtains the waveform setting values B1 to C3 or the waveform reference values b1 to c3 according to the reflected light.

Figure 6:
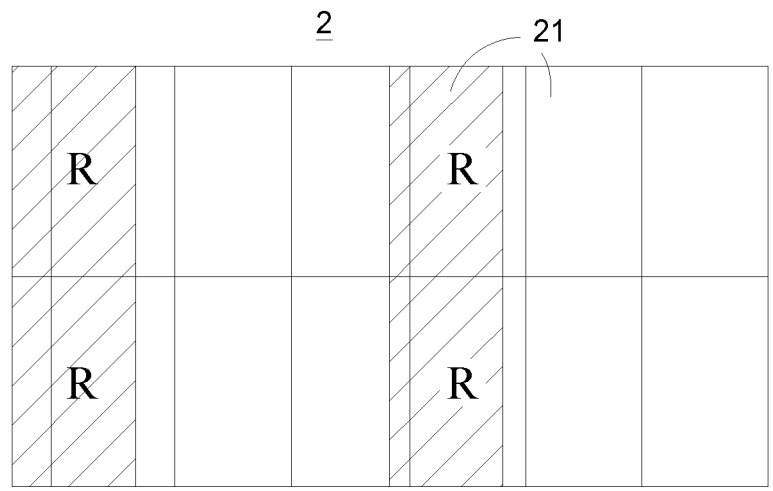
FIG. 6 is a schematic view according to another embodiment of the present invention, illustrating an abnormal pixel pattern of a display panel to be tested.
Figure 7:
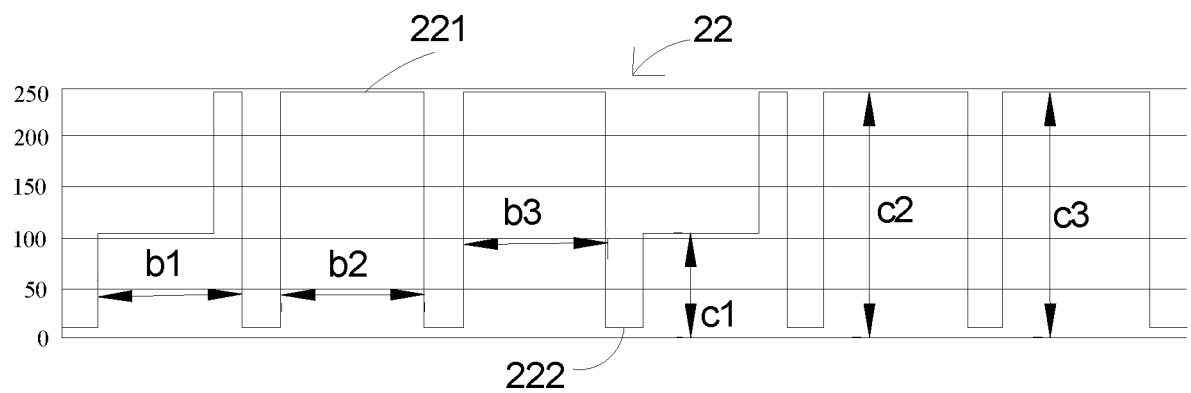
FIG. 7 is a grayscale waveform diagram for an entire frame, which is generated based on FIG. 6.

The present invention further comprises step S40: when the alerting message is sent out, a technician shuts down a machine, determines a color-shift abnormal type, and adjusts a corresponding process parameter, wherein the color-shift abnormal type includes a pixel color-loss type or a pixel color-shift type. According to the first embodiment shown in FIGS. 4 and 5, the color-shift abnormal type is determined as the pixel color-loss type. In the embodiment of FIGS. 6 and 7, the color-shift abnormal type is determined as the pixel color-shift type.

In the second embodiment shown in FIGS. 6 and 7, similarly, the pixel pattern 2 of the display panel is constituted by sub-pixels 21 such as red, green, and blue (RGB) sub-pixels. FIG. 6 merely shows red sub-pixels 21. As shown in FIG. 7, the grayscale waveform diagram 22 has a plurality of waveform reference values b1 to c1. The predetermined difference values are obtained by comparing each of the wave width setting values B1 to B3 and each of the wave width reference values b1 to b3 and by comparing each of the wave height setting values C1 to C3 and each of the wave height reference values c1 to c3, wherein an alerting message is sent out when any of the predetermined difference values exceeds a specified value.

In the embodiment of FIGS. 6 and 7, the alerting method further comprises obtaining a difference value between each two adjacent wave width reference values b1 to b3 or each two adjacent wave height reference values c1 to c3, wherein the alerting message is sent out when the difference value exceeds a specified value.

The present invention further provides an alerting device for monitoring a color shift of a display panel. The alerting device uses the above-mentioned alerting method for monitoring the color shift of the display panel. The alerting device comprises a monitoring member and a software module, the monitoring member generates the grayscale waveform diagrams, and the software module automatically generates the waveform setting values or the waveform reference values. The monitoring member comprises an imaging assembly and a procedure module stored in the imaging assembly, wherein according to the grayscale waveform diagrams of the display panel or the display panel to be tested, the imaging assembly automatically generates the waveform setting values or the waveform reference values by a software module. The imaging assembly comprises a light source and a charged coupled device (CCD) connected to the light source, the CCD receives reflected light from the light source, and the software module obtains the waveform setting values or the waveform reference values according to the reflected light. Other components in the alerting device are conventional techniques, so a detailed description is omitted herein for brevity.

In the monitoring method of the present invention, the grayscale waveform diagram for the entire frame, obtained by the monitoring member, is converted to the waveform setting values or the waveform reference values. Then, the monitoring method obtains the predetermined difference value between each of the waveform reference values and each of the waveform setting values. Furthermore, by using the software module of the monitoring member, users can adjust the wave width setting values B1 to B3 and the wave height setting values C1 to C3, thus facilitating adjustment and sensitivity, and effectively detecting abnormality of color resists. Accordingly, the present invention effectively provides the alerting messages/reminders displayed on a screen, so that an on-site personnel can adjust process parameters in real time, and production yields for RGB color resists and display quality can be improved.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. An alerting method for monitoring a color shift of a display panel, comprising:
   step S10: generating a grayscale waveform diagram for an entire frame according to a normal pixel pattern of the display panel, wherein the grayscale waveform diagram has a plurality of waveform setting values;
   step S20: generating a grayscale waveform diagram for an entire frame according to a pixel pattern of a display panel to be tested, wherein the grayscale waveform has a plurality of waveform reference values; and
   step S30: obtaining a predetermined difference value between each of the waveform reference values and each of the waveform setting values, wherein an alerting message is sent out when the predetermined difference value exceeds a specified value,
   wherein in step S30, the waveform setting values comprise a plurality of wave width setting values and a plurality of wave height setting values, the waveform reference values comprise a plurality of wave width reference values and a plurality of wave height reference values, and the alerting message is an alarm sound or a reminder displayed on a screen; and
   wherein the alerting method further comprises obtaining a difference value between each two adjacent wave width reference values or each two adjacent wave height reference values, wherein the alerting message is sent out when the difference value exceeds a specified value.

2. The alerting method for monitoring the color shift of the display panel according to claim 1, wherein the predetermined difference values are obtained by comparing each of the wave width setting values and each of the wave width reference values and by comparing each of the wave height setting values and each of the wave height reference values, wherein an alerting message is sent out when any of the predetermined difference values exceeds a specified value.

3. The alerting method for monitoring the color shift of the display panel according to claim 1, wherein in step S10 and step S20, the alerting method further comprises generating, by a monitoring member, each of the grayscale waveform diagrams; the monitoring member comprises an imaging assembly and a procedure module stored in the imaging assembly; and according to the grayscale waveform diagrams of the display panel or the display panel to be tested, the imaging assembly automatically generates the waveform setting values or the waveform reference values by a software module.

4. The alerting method for monitoring the color shift of the display panel according to claim 3, wherein the imaging assembly comprises a light source and a charged coupled device (CCD) connected to the light source, the CCD receives reflected light from the light source, and the software module obtains the waveform setting values or the waveform reference values according to the reflected light.

5. The alerting method for monitoring the color shift of the display panel according to claim 1, further comprising step S40: when the alerting message is sent out, shutting down a machine, determining a color-shift abnormal type, and adjusting a corresponding processing parameter, wherein the color-shift abnormal type includes a pixel color-loss type or a pixel color-shift type.

6. The alerting method for monitoring the color shift of the display panel according to claim 1, wherein a horizontal axis of the grayscale waveform diagram indicates a distance, a vertical axis of the grayscale waveform diagram indicates brightness, the grayscale waveform diagram further comprises a plurality of waveforms and a pixel pitch connected between the waveforms, each of the waveforms is a square wave, and brightness of each pixel pitch is close to zero.

7. An alerting device for monitoring a color shift of a display panel, comprising use of the alerting method for monitoring the color shift of the display panel as claimed in claim 1.

8. The alerting device for monitoring the color shift of the display panel according to claim 7, wherein the waveform setting values comprise a plurality of wave width setting values and a plurality of wave height setting values, the waveform reference values comprise a plurality of wave width reference values and a plurality of wave height reference values, and the alerting message is an alarm sound or a reminder displayed on a screen.

9. The alerting device for monitoring the color shift of the display panel according to claim 8, wherein the predetermined difference values are obtained by comparing each of the wave width setting values and each of the wave width reference values and by comparing each of the wave height setting values and each of the wave height reference values, wherein an alerting message is sent out when any of the predetermined difference values exceeds a specified value.

10. The alerting device for monitoring the color shift of the display panel according to claim 8, wherein the alerting message is sent out when a difference value between each two adjacent wave width reference values or each two adjacent wave height reference values exceeds a specified value.

11. The alerting device for monitoring the color shift of the display panel according to claim 7, wherein the alerting device comprises a monitoring member and a software module, the monitoring member generates the grayscale waveform diagrams, the software module automatically generates the waveform setting values or the waveform reference values, the monitoring member comprises an imaging assembly and a procedure module stored in the imaging assembly, wherein according to the grayscale waveform diagrams of the display panel or the display panel to be tested, the imaging assembly automatically generates the waveform setting values or the waveform reference values by a software module.

12. The alerting device for monitoring the color shift of the display panel according to claim 11, wherein the imaging assembly comprises a light source and a charged coupled device (CCD) connected to the light source, the CCD receives reflected light from the light source, and the software module obtains the waveform setting values or the waveform reference values according to the reflected light.

13. The alerting device for monitoring the color shift of the display panel according to claim 7, wherein when the alerting message is sent out, an operator shuts down a machine, determines a color-shift abnormal type, and adjusts a corresponding processing parameter, wherein the color-shift abnormal type includes a pixel color-loss type or a pixel color-shift type.

14. The alerting device for monitoring the color shift of the display panel according to claim 7, wherein a horizontal axis of the grayscale waveform diagram indicates a distance, a vertical axis of the grayscale waveform diagram indicates brightness, the grayscale waveform diagram further comprises a plurality of waveforms and a pixel pitch connected between the waveforms, each of the waveforms is a square wave, and brightness of each pixel pitch is close to zero.

* * * * *